US011928045B1

(12) United States Patent
Bhattacharya et al.

(10) Patent No.: US 11,928,045 B1
(45) Date of Patent: Mar. 12, 2024

(54) SYSTEM AND METHOD FOR NON-INTRUSIVE DEBUGGING AT AN EMBEDDED SOFTWARE BREAKPOINT

(71) Applicant: Cadence Design Systems, Inc., San Jose, CA (US)

(72) Inventors: Bishnupriya Bhattacharya, Bengaluru (IN); Andrew Robert Wilmot, Carlisle, MA (US); Zhiting Duan, Chelmsford, MA (US); Neeti Khullar Bhatnagar, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 275 days.

(21) Appl. No.: 17/236,584

(22) Filed: Apr. 21, 2021

(51) Int. Cl.
G06F 11/36 (2006.01)
G06F 9/455 (2018.01)
G06F 9/48 (2006.01)
G06F 30/30 (2020.01)
G06F 115/10 (2020.01)

(52) U.S. Cl.
CPC ...... *G06F 11/3636* (2013.01); *G06F 9/45504* (2013.01); *G06F 9/485* (2013.01); *G06F 30/30* (2020.01); *G06F 2115/10* (2020.01)

(58) Field of Classification Search
CPC ...... G06F 11/3636; G06F 30/30; G06F 9/455; G06F 9/485; G06F 2115/10
See application file for complete search history.

(56) References Cited

U.S. PATENT DOCUMENTS

| 6,477,683 | B1 * | 11/2002 | Killian | G06F 30/30 716/139 |
| 6,862,694 | B1 * | 3/2005 | Tormey | G06F 11/362 714/34 |
| 7,020,768 | B2 * | 3/2006 | Swaine | G06F 11/3636 712/E9.046 |
| 7,243,059 | B2 * | 7/2007 | Crowell | G06F 9/45504 703/22 |
| 8,024,620 | B2 * | 9/2011 | Moyer | G06F 11/3648 717/124 |

(Continued)

OTHER PUBLICATIONS

Ghost et al., "A hardware-software co-simulator for embedded system design and debugging", published—ASP-DAC '95: Proceedings of the 1995 Asia and South Pacific Design Automation Conference, Aug. 1995 , pp. 1-10 (Year: 1995).*

(Continued)

*Primary Examiner* — S. Sough
*Assistant Examiner* — Zheng Wei
(74) *Attorney, Agent, or Firm* — Mark H. Whittenberger, Esq.; Holland & Knight LLP

(57) ABSTRACT

The present disclosure relates to a method for use with an electronic design. Embodiments may include simulating a processor model and a hardware model, each executed with a corresponding simulator thread on a simulation platform. Embodiments may also include simulating embedded software using the processor model. The simulating may include updating a given register of the processor model that stores a value that changes in response to switching between processes within the embedded software. Embodiments may further include setting a simulator breakpoint and a software breakpoint and enabling debugging of both non-virtual and virtual addresses at the software breakpoint without leaving the software breakpoint.

20 Claims, 12 Drawing Sheets

(56) References Cited

U.S. PATENT DOCUMENTS

| | | | |
|---|---|---|---|
| 8,229,726 B1* | 7/2012 | Magdon-Ismail | G06F 30/33 |
| | | | 703/22 |
| 8,271,955 B1* | 9/2012 | Lindahl | G06F 11/3636 |
| | | | 714/45 |
| 9,542,301 B1* | 1/2017 | Griesemer | G06F 11/36 |
| 11,048,563 B2* | 6/2021 | Wilkinson | G06F 9/485 |
| 2004/0102953 A1* | 5/2004 | Agarwala | G06F 11/3636 |
| | | | 703/24 |
| 2014/0298336 A1* | 10/2014 | Taniuchi | G06F 9/455 |
| | | | 718/1 |

OTHER PUBLICATIONS

El-Moursy et al., "Efficient Embedded SoC Hardware/Software Codesign using Virtual Platform", published by IEEE, 2014 9th International Design and Test Symposium, pp. 36-38 (Year: 2014).*

* cited by examiner

SYSTEM AND METHOD FOR NON-INTRUSIVE DEBUGGING AT AN EMBEDDED SOFTWARE BREAKPOINT

FIELD OF THE INVENTION

The embodiments of the present disclosure relate generally to the field of system development and test, and more specifically to event-driven simulation and emulation of electronics.

BACKGROUND

Simulation of hardware components can be modeled at various levels of abstraction using event-driven simulation. Processor models in combination with hardware simulators can be used to simulate cross-compiled embedded software, for example, an operating system (OS). A collection of hardware models running such embedded software is known as a simulation platform. A simulation platform may also include models of peripherals such as memory modules, the system bus, universal asynchronous receivers (UARTs), terminals, USB devices, etc. When the environment includes processor models, it is also possible for the event-driven simulation or emulation environment to simulate the behavior of the actual cross-compiled embedded software (ESW) running on the processor models within the system.

Debugging these issues is often complicated by a simulated platform's environment limitations, which typically restrict observability and controllability of the hardware models and embedded software simulation. Additionally, applications running on top of the embedded software may create unexpected errors and require verification and testing. However, because debuggers typically run on the same operating system on which the application is being tested, this can create atypical system conditions and reduce the effectiveness of the test and debug process. Current simulators that provide for interactive debugging of ESW running on a processor model within the simulated system do not allow for non-intrusive interactive software/hardware debugging, including memory and variable viewing, without the use of special model APIs that provide for viewing memory of the processor model.

SUMMARY

Accordingly, an embodiment of the present disclosure is directed to a computer-implemented method for use with an electronic design. The method may include simulating a processor model representative of a processor and a hardware model representative of a hardware element, wherein each of the processor model and the hardware model are executed with a corresponding simulator thread on a simulation platform. The method may further include simulating embedded software using the processor model, wherein the simulating comprises updating a given register of the processor model that stores a value that changes in response to switching between processes within the embedded software. The method may also include setting a simulator breakpoint, wherein the change of state in the given register is captured at the simulator breakpoint. The method may further include setting a software breakpoint at the function that switches between processes within the embedded software. The method may also include enabling debugging of both non-virtual and virtual addresses at the software breakpoint without leaving the software breakpoint.

One or more of the following features may be included. In some embodiments, the method may include issuing a transaction function call in the context of a debugger control thread, when the user attempts to debug any processor visible non-virtual address at a breakpoint on a virtual processor. The method may further include intercepting the transaction function call and diverting the transaction function call to an application programming interface associated with a simulator. The method may also include spawning and scheduling a special virtual thread in the simulator to issue a non-debug transaction to the user-specified non-virtual address with the necessary state from the transaction function call. The method may include suspending the virtual processor thread that reached the software break point, and in some embodiments, may include setting up an internal break point. The method may also include switching to the context of the simulator main thread to run the simulation. In the course of the subsequent simulation run, the special virtual thread spawned by the debugger control thread may execute, and may accomplish the completion of the non-debug transaction to the user-specified non-virtual address. The method may further include triggering the internal break point, and resuming the previously suspended virtual processor thread. The method may also include switching control back to the context of the debugger control thread, obtaining the results of the pending transaction function call, and returning the result to the debugger.

In another embodiment of the present disclosure a computing system for use in an electronic circuit design is provided. The system may include a memory storing machine-readable instructions comprising a plurality of component models comprising a processor model representative of a processor and a hardware model representative of a hardware element, embedded software for execution using the processor model during a simulation of the plurality of component models. The processor may be configured to access the memory and execute the machine-readable instructions, the machine-readable instructions causing the processor to perform one or more operations. Operations may include simulating a processor model representative of a processor and a hardware model representative of a hardware element, wherein each of the processor model and the hardware model are executed with a corresponding simulator thread on a simulation platform. Operations may further include simulating embedded software using the processor model, wherein the simulating comprises updating a given register of the processor model that stores a value that changes in response to switching between processes within the embedded software. Operations may also include setting a simulator breakpoint, wherein the change of state in the given register is captured at the simulator breakpoint. Operations may further include setting a software breakpoint at the function that switches between processes within the embedded software. Operations may also include enabling debugging of both non-virtual and virtual addresses at the software breakpoint without leaving the software breakpoint.

One or more of the following features may be included. In some embodiments, operations may include issuing a transaction function call in the context of a debugger control thread, when the user attempts to debug any processor visible non-virtual address at a breakpoint on a virtual processor. Operations may further include intercepting the transaction function call and diverting it to an application programming interface associated with a simulator. Operations may also include spawning and scheduling a special virtual simulator thread to issue a non-debug transaction to the user-specified non-virtual address with the necessary state obtained from the debug transaction. Operations may further include suspending the virtual processor thread that reached the breakpoint, and in some embodiments may include setting up an internal break point. Operations may include switching to the context of the simulator main thread to run the simulation. In the course of the subsequent simulation run, the special virtual thread spawned by the debugger control thread may execute, and may accomplish the completion of the non-debug transaction to the user-specified non-virtual address. Operations may further include triggering the internal break point, and resuming the previously suspended virtual processor thread. Operations may also include switching control back to the context of the debugger control thread, obtaining the results of the pending transaction function call, and returning the result to the debugger.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A system and method are described for supporting interactive debugging of embedded software (ESW) on a simulation platform. A processor model within the simulated system may support a register and memory tracing sub-module that will not affect the processor's interactions with external hardware models. Simulator and emulator breakpoints may be used with the modeled objects within the tracing sub-module. For example, a simulator breakpoint may be set for the task or function that buffers the trace information so that it can be written to a file. The trace information can then be parsed or analyzed to create a database of register and memory values that represent the complete history of register and memory value changes during a simulation or emulation session. This database can be accessed to determine the current value of any processor register or memory value from the point of view of the processor. The information in the database can also be combined with symbolic software debugging information (e.g. Executable and Linkable Format (ELF) and Debugging With Attributed Record Formats (DWARF) compiler created files) to allow a debugger to show the value of any ESW variable accessed by the processor.

As simulation or emulation progresses, a simulator breakpoint can be used to implement ESW breakpoints or watchpoints. For ESW breakpoints, the value of a program counter (PC) register can be obtained from the trace data at a simulator breakpoint and can be compared with PC values which represent the location of user breakpoints as specified by a user for particular source lines or functions in the ESW. Similarly, memory trace data obtained at the simulator breakpoint can be compared with memory locations which correspond to ESW variable memory locations to determine if a particular ESW variable has changed value and so implement ESW watchpoints.

Figure 1:
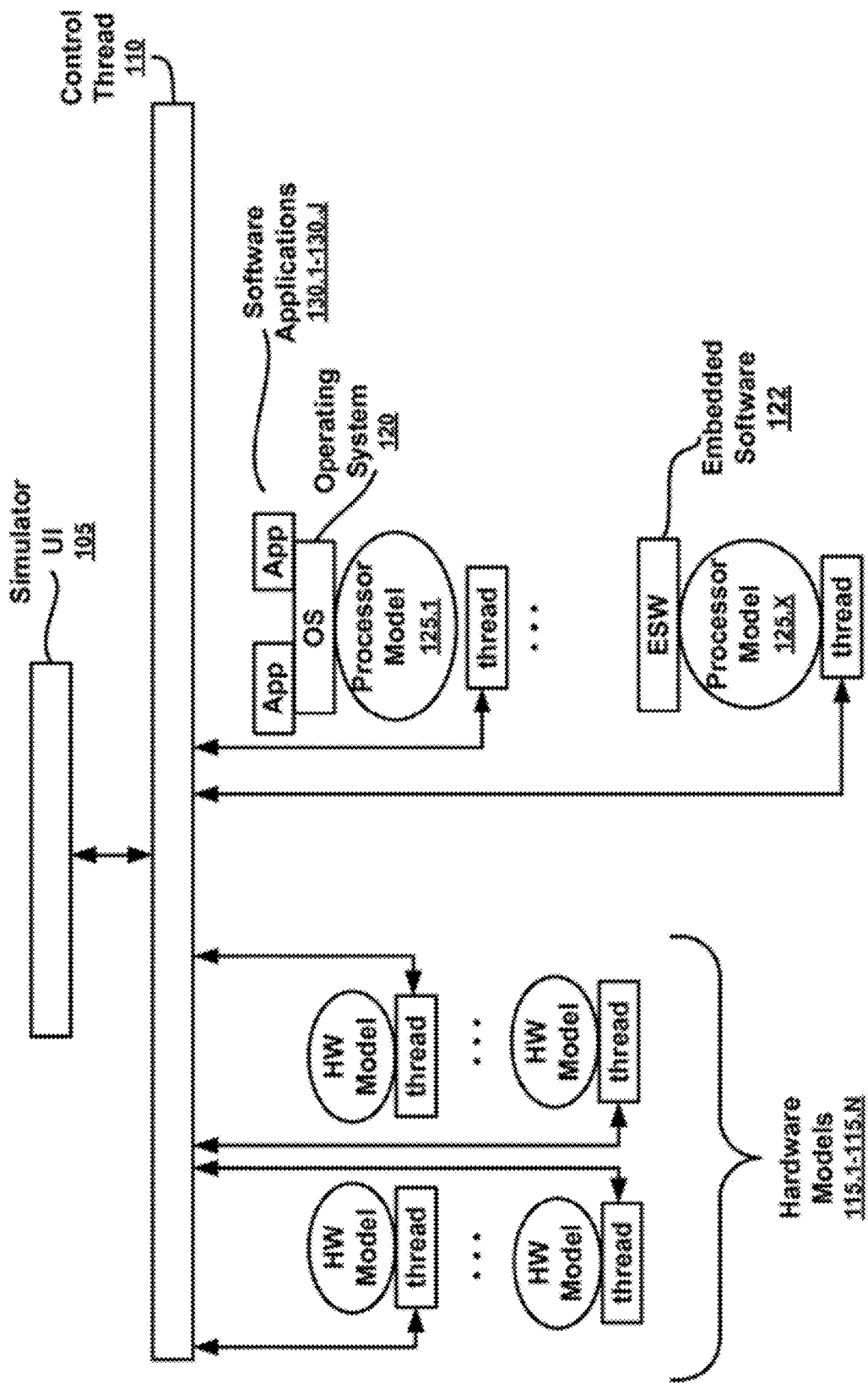
FIG. 1 illustrates an exemplary simulation platform according to an embodiment of the present disclosure.

FIG. 1 illustrates an exemplary simulation platform 100 according to an embodiment of the present invention. In FIG. 1, a simulator interface 105 is implemented to provide control and observability for the components of the simulation platform 100. The simulator interface 105 is executed on a control thread 110.

A modeled component as described herein refers to either a hardware component, a bare-metal software program or OS running within the context of a processor hardware component, or a process running on an OS running within the context of a processor hardware component. According to an embodiment of the present invention, the simulator platform 100 may run multiple hardware component models in sequence, with each modeled hardware component using separate host platform resources. Platform resources can include a simulator thread or process, or a call stack that is maintained for each modeled component. A simulator thread as used herein refers to a hardware component modeled within an event-driven simulator which has its own call stack context.

Simulator interface 105 runs in a control thread 110 separate from the modeled components of the simulated platform. State information and other simulation related information for the modeled components is then made available via simulation commands executed by the control thread 110 when control of the simulation returns to the control thread 110.

In FIG. 1, each modeled component is executed on a simulator thread. For example, each hardware model is executed on a simulator thread of the simulator platform. When a modeled component is executed in the course of the event driven simulation, the simulator thread for that model will become active. When a breakpoint or watchpoint in the source code implementing the modeled component is reached, the active simulator thread will yield control to the control thread 110.

Each of the modeled components of the simulation platform 100 is simulated using individual platform resources as described above. Each of the multiple modeled hardware components 115.1-115.N is executed with individual simulator threads. An OS 120 may be simulated with reference to a processor model 125.1-125.X modeling a processor running on a modeled hardware component. Each software application 130.1-130.J or application process running on the OS 120 will be executed as an OS process as necessary. Software applications 130.1-130.J may be any process or application designed to run on the OS. The simulation platform will also simulate the behavior of cross-compiled embedded software 122 running on the processor models 125.1-125.X.

According to an embodiment, interactive debugging of embedded software on the simulation platform 100 includes using a processor model that supports a register and memory tracing sub-module. A simulator breakpoint as described herein may then be set on the task or function which buffers the trace information so that the trace information can be written to a file.

Figure 2:
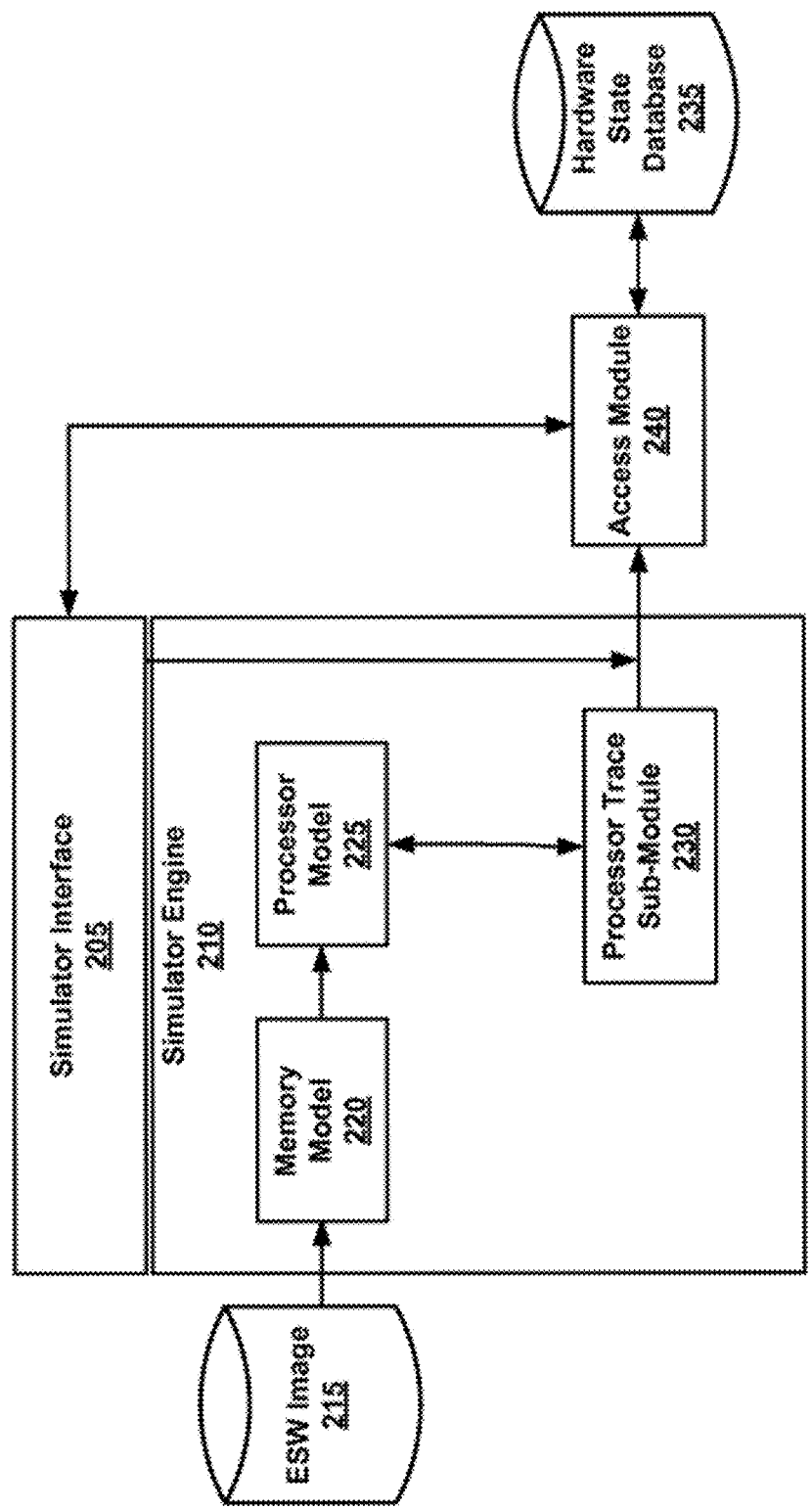
FIG. 2 is a simple block diagram illustrating components of an exemplary system according to an embodiment of the present disclosure.

FIG. 2 is a simple block diagram illustrating components of an exemplary system according to an embodiment. As shown in FIG. 2, a simulator interface 205 is provided to execute and monitor a simulation or emulation. As described above, the simulation platform will simulate the behavior of cross-compiled embedded software running on processor models. For example, a simulator engine 210 may access an embedded software (ESW) image 215 to simulate a memory model 220 on a processor model 225. Changes in the state of a hardware element of the simulator, for example, a change to a register value, will be captured by the processor trace sub-module 230. The captured information will then be parsed and stored in a database 235 using the access module 240. Interactive simulation is supported by creating a simulation breakpoint whenever a trace is being written. A breakpoint can also be initiated by a user at the user interface 205.

Capturing trace information during simulation is more fully described in co-pending patent application Ser. No. 14/582,800 entitled "Post Simulation Debug and Analysis Using a System Memory Model," filed Dec. 24, 2014, the disclosure of which is incorporated herein by reference in its entirety.

The modeled components will produce multiple traces during simulation or emulation of the system model. The traces will then be captured. According to an embodiment, the traces could be instantiated in the form of a single file, multiple files, or the trace data could arrive in groups of messages, in a database, etc. The individual traces could even be combined into a single information stream or file.

Then, from the captured traces, a trace event can be extracted. For example, events that occur either at a specific simulation time (e.g., at time 2 ns after simulation or execution start) or that occur in a specific execution sequence (e.g., the event was the 1014th that occurred after simulation or execution commenced) can be identified.

An exemplary execution trace message may include the following information: the device or element that executed the traced action (e.g., Processor X), the action that occurred (e.g., read/write), a length or number of words or lines affected (e.g., 1 word of memory), the value of the word or line (e.g., 0x01), the address that was accessed (e.g., 0x1111212), and the time the event occurred (e.g., 2 ns). The form and contents of the trace message may vary, but should provide sufficient information to extract event information in order to create a complete and accurate view of the system memory over time.

Bus transaction traces can have many formats. For example, the format of a bus trace can vary depending on the standard and system producing the trace, (e.g. the TLM 2.0 standard, ARM Tarmac Memory Bus Trace, etc.). However, a bus trace should include the following information: the initiator or master device that generated the bus transaction, the target or slave device that provides the information requested by the bus transaction, a mode such as read, write, read/write, etc., a time when the transaction occurred, the length of bytes that were requested, the address of the data that was written or read, and the data that was read or written. An exemplary bus trace message (simplified and expressed in human readable form) could be "Device dev1 reads 4 bytes of memory receiving value 0x20 from address 0x122211 of target device memory1 at time 23 ns". The form and contents of the trace message may vary, but should provide sufficient information to extract event information to contribute to a complete and accurate view of the system memory over time.

Similarly, a register trace message may include the device that interacted with the register (e.g., device dev1), the register that was affected (e.g., register RO), the value the register was changed to (e.g., 0x0), and the time the event occurred (e.g., 2 ns). The form and contents of the trace message may vary, but should provide sufficient information to extract event information to contribute to a complete and accurate view of the system memory over time.

When an execution trace parser parses out a message that either shows a memory value that it retrieved by reading from a memory or by writing a value to memory the parser commits the trace to the database 235. When a bus transaction trace parser parses out a bus transaction, it first determines whether the target device is a memory being tracked in the database 235. If it is, the value that was either written or read is committed to the database 235. Bus transactions for target devices not being tracked may be ignored.

When a peripheral register trace parser parses out a register value change, it first uses a memory map to find out which address in physical memory should be updated when the register changes value. Then the value that was either written or read is committed to the database 235 by the access module 240 using the address determined from the memory map.

A memory device such as a database 235 stores a representation of the system memory as a function of time. The database supports read and write operations. For example, an exemplary readMemory command may have the following inputs: a base address in memory, a length, and a time value. The readMemory command will then return the data from memory that was present at the provided value time. The time value may represent simulation time, execution time, sequence, etc. The readMemory command will return either a value that was recorded from the received traces or zero if no trace operation involving the given memory address was discovered during trace parsing. An exemplary writeMemory command will include a base address, a length, a time value, and a data value that will be written to the database. According to an embodiment, the database 235 is a temporal database. Consequently, if no trace event occurred at the precise moment of time requested by the input time value, the database 235 will retrieve the value that was last set by reviewing earlier moments in time to identify the last event that affected that memory (if there was one). According to an embodiment, the database 235 could be implemented as a temporal sparse matrix or a three dimensional matrix.

According to an embodiment, a representation of ESW data structures and entry points will be accessible via the access module 240 in communication with the memory database 235. For example, a Program Counter (PC) register value can be stored that represents a function in the embedded software that switches between processes. This information may be captured and stored in the database. The PC register will be monitored during simulation of the system model and when the value of the PC register changes, a breakpoint, watchpoint, register event, transaction, or other change is detected and a trace will be stored to the database. Information relevant to the simulation can later be retrieved from the database 235 using the access module 240 and presented to the user via the simulator interface 205.

According to an embodiment, breakpoints may be entered manually via the simulation interface by a user during interactive debug operations.

Figure 3:
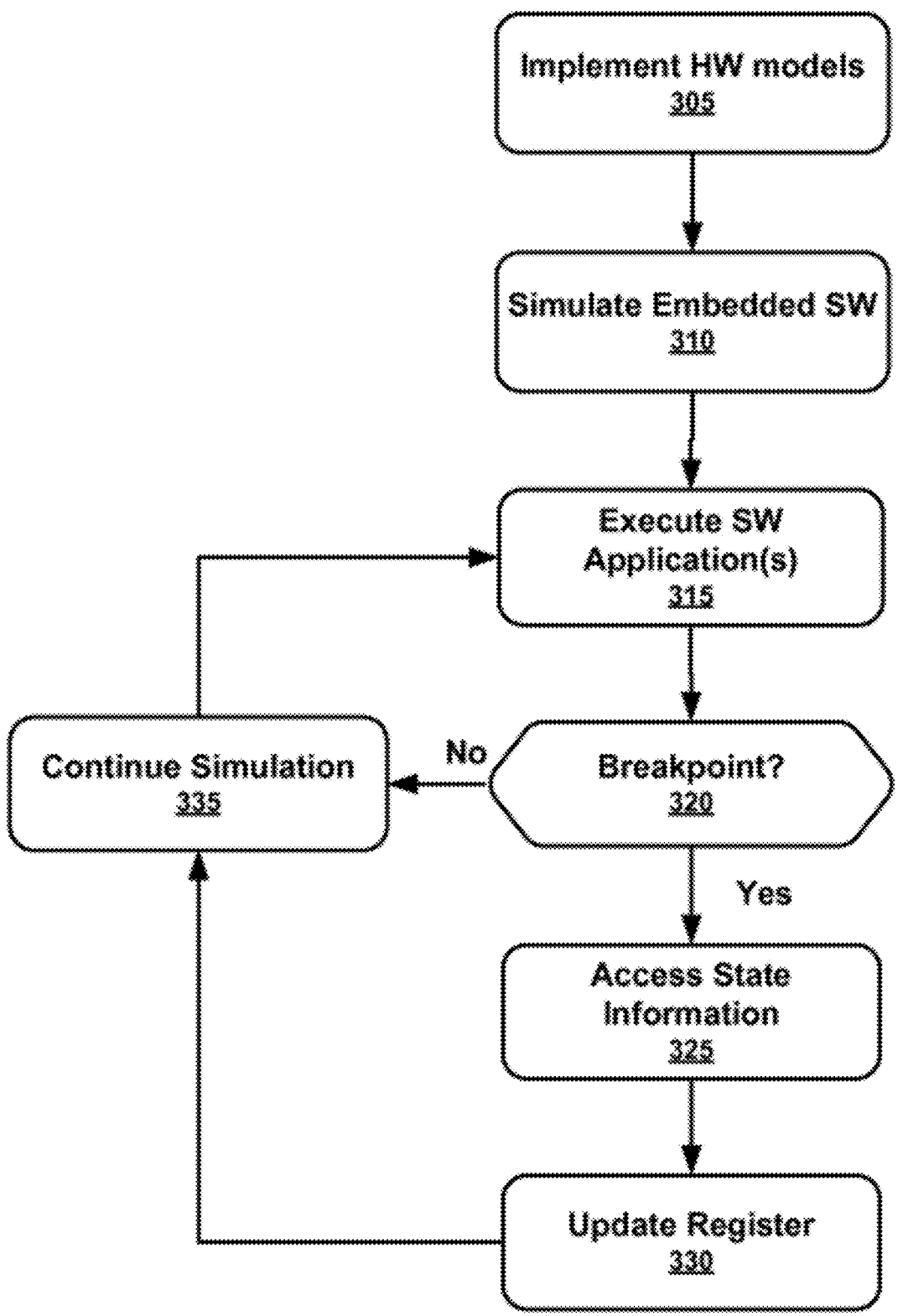
FIG. 3 illustrates an exemplary method for simulating embedded software components implemented on a simulation platform according to an embodiment of the present disclosure.

FIG. 3 illustrates an exemplary method 300 for simulating embedded software components implemented on a simulation platform according to an embodiment of the present invention. As shown in FIG. 3, to simulate a system including hardware models, embedded software, and software applications running on the embedded software, one or more hardware models may be implemented (block 305). Additionally, one or more embedded software applications may be simulated, for example by using a processor model (block 310). Then, one or more high-level software applications may be executed with the simulated embedded software (block 315). The simulation may step sequentially through the execution of each high-level software application, embedded software application, and hardware model as necessary to run the high-level application, thereby simulating an event-driven system.

During execution, if the source code for any component reaches a breakpoint, a watchpoint, or other stop point (e.g. an error) (block 320), control of the simulation will transfer to a control thread. The control thread will then allow a controller or event manager of the system to access state information of one or more modeled components or other information, or otherwise execute an additional command as part of the debug and verification process (block 325). This transition of control will be captured in the PC register (block 330). The change in the register value will be captured with a register trace and stored in the hardware state database (not shown). Then, during debug or analysis operations, the register changes can be queried via the hardware state database to identify a change in value that represents a breakpoint.

Once the conditions of the breakpoint have been handled, the simulation may return to the simulator thread that was executing when the breakpoint was reached or otherwise continue the simulation by sequentially stepping through the application procedures (block 335).

The insertion or creation of complex breakpoint conditions within a simulation platform is described in further detail in co-pending U.S. Pat. Nos. 10,339,229, Issued Jul. 2, 2019, U.S. Pat. No. 9,262,305, Issued Feb. 16, 2016, and U.S. Pat. No. 9,262,299, Issued Feb. 16, 2016, the disclosures of which are incorporated herein by reference in their entirety.

According to an embodiment of the present invention, to facilitate stepping through the source code of the modeled components implemented in a simulator platform, the system may insert breakpoints at certain common actions as described above. For a simulator running multiple hardware models in sequence with each model having a separate simulator execution thread, hardware stepping yields control from the simulator threads associated with individual models back to the control thread after a predetermined number of source lines of the model have been executed. Objects representing hardware elements may be updated as the simulator progresses, which updates may be captured in trace statements that are parsed and stored in the hardware state database.

Similarly, software stepping yields execution control from the embedded software to the control thread after a predetermined amount of software source code has been executed. When a stepping operation to cross the software and hardware domains so that either the next software or hardware source code line, as appropriate, will be executed in sequence before returning to the control thread, the transition will be recorded, for example in the PC register. Then during debug the register changes can be queried via the database.

Inserting breakpoints to facilitate stepping between domains in the simulated platform is further described in the aforementioned co-pending U.S. Patent Applications.

Referring now to FIGS. 4-9, embodiments of the present disclosure directed towards a method for non-intrusive debugging of (non-virtual) RTL addresses at an embedded software break point executing on a (virtual) SystemC model of a processor in a hybrid platform are provided. As discussed above, event-driven simulation and emulation environments allow the simulation or emulation of electronics hardware elements modeled at various levels of abstraction. When processor models are available, it is also possible for the event-driven simulation or emulation environment to simulate the behavior of the actual cross-compiled embedded software running on processor models within the system, and to debug such embedded software. Such a collection of hardware models capable of running and debugging collections of embedded software will be termed an ESW platform in the rest of this document. When the hardware models include mixed-abstraction models with both register transfer level (RTL) models written in a hardware description language like Verilog or VHDL, as well as transaction level models (TLM) written in SystemC (henceforth referred to as 'virtual models'), such an ESW platform may be referred to as a hybrid ESW platform. When debugging an ESW running on a virtual model of a processor, if the simulation stops at an ESW breakpoint, a key requirement is to debug the content of various address locations visible to the virtual processor, by reading or writing to these addresses.

In a hybrid platform, some of these addresses may be mapped to virtual models, while some addresses may be mapped to non-virtual, RTL models. For debug access to virtual models, the ESW debugger uses transactions or function calls directly into the model that does not require the simulator to run. However, RTL models do not support debug transactions. Instead, to read or write to an RTL address, the actual behavior inside the RTL model needs to be executed, by running the simulator, and consuming simulation time. Normally, during this simulation run for debug access to RTL models, the virtual processor model will also run, advancing the state of the ESW. However, for the ESW debugger, a fundamental requirement is not to advance the state of the ESW from the breakpoint, while debugging any address. Accordingly, embodiments included herein address how to enable a single point of control for an ESW debugger within a simulator to debug both non-virtual and virtual addresses at an ESW breakpoint without moving the ESW from its breakpoint. Embodiments included herein provide a methodology to run the simulation on demand at an ESW break point to service debug access of RTL addresses, while not advancing the ESW state from its breakpoint.

Figure 4:
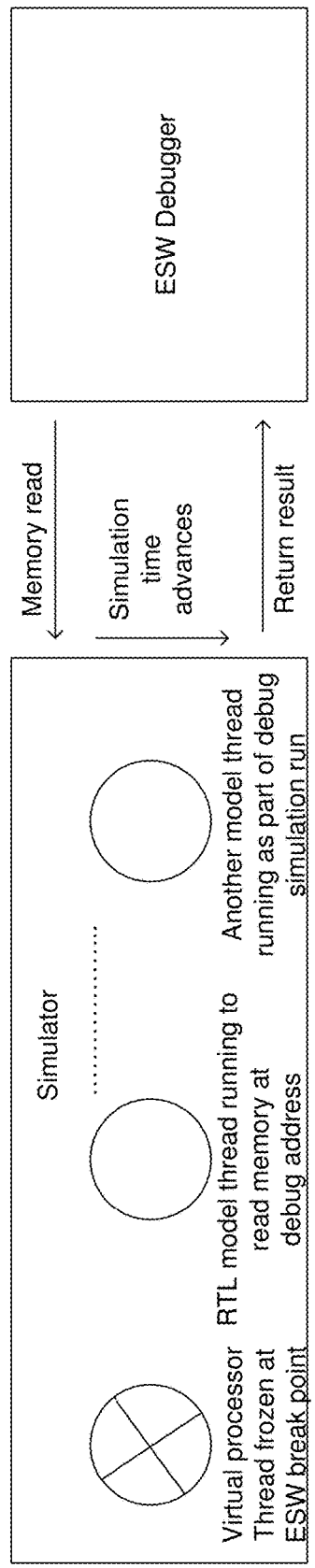
FIG. 4 illustrates a block diagram illustrating components of an exemplary system according to an embodiment of the present disclosure.
Figure 5:
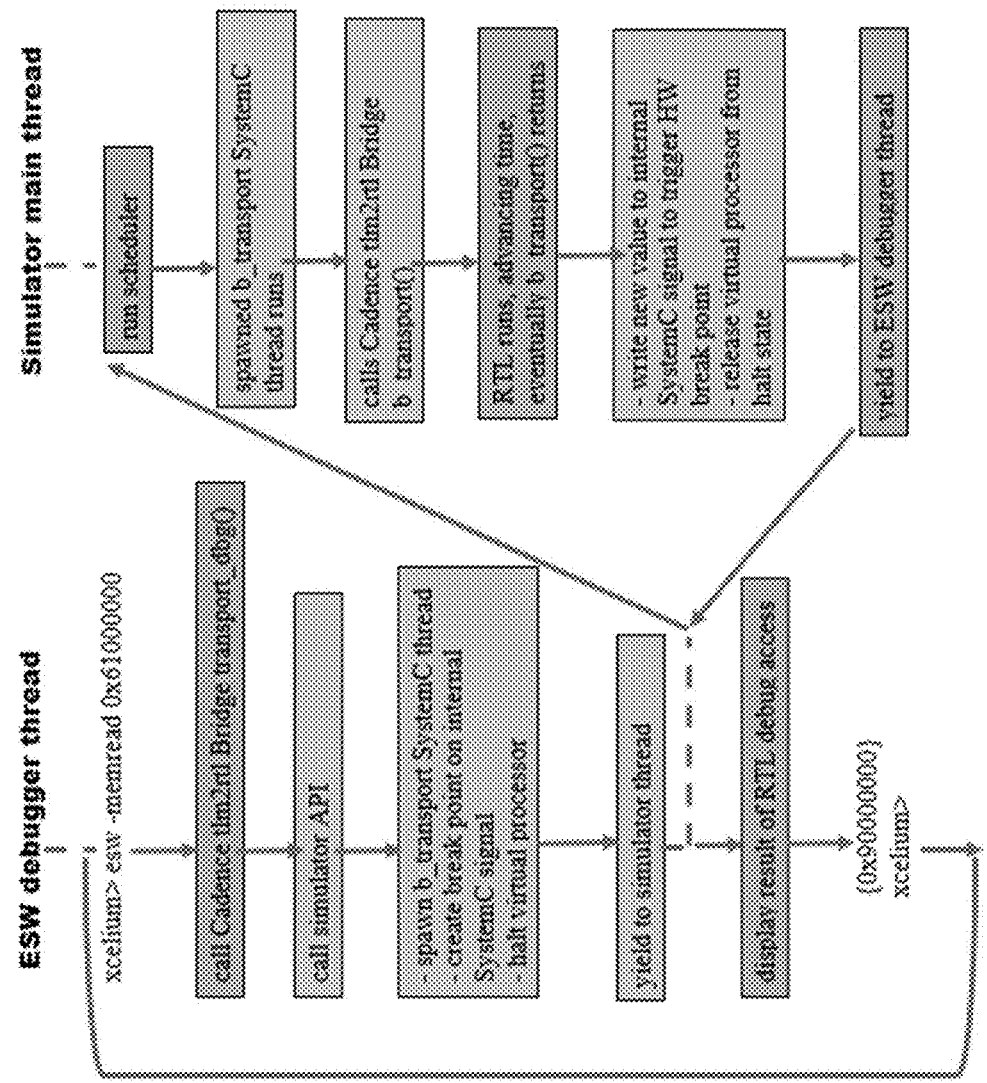
FIG. 5 illustrates a flowchart of an exemplary flowchart according to embodiment of the present disclosure.

In some embodiments, and referring also to FIGS. 4-5, from the ESW debugger, the process may issue a transaction function call in the context of the ESW debugger control thread. This may occur whenever the user attempts to debug any processor visible address in an RTL model at an ESW breakpoint on a virtual processor. The process may then intercept the transaction function call at a bridge model used in the platform at the virtual-RTL boundary, and divert it to an API associated with the simulator. The process may be configured to spawn and schedule a special virtual thread in the simulator to issue a non-debug transaction to the user-specified RTL address with the necessary state obtained from the debug transaction. The process may suspend and/or halt the virtual processor thread that stopped at the ESW breakpoint, and may set up an internal break point on a simulation implementation artefact. The process may then switch to the context of the simulator main thread to run the simulation. In the course of the subsequent simulation run, the special virtual thread spawned by the ESW debugger control thread may execute, and may accomplish the completion of the non-debug transaction to the user-specified RTL address. The process may then trigger the internal break point by writing a new value to the simulation implementation artefact, and resume the previously suspended/halted virtual processor thread. As a result of triggering the internal break point, control may switch back to the context of the ESW debugger control thread, and the process may obtain the results of the pending transaction function call from the special virtual thread and return the result to the ESW debugger. The flowchart shown in FIG. 5 shows how the ESW debugger thread described herein may interact with the simulator main thread for minimal intrusion and for stable simulator states.

Figure 6:
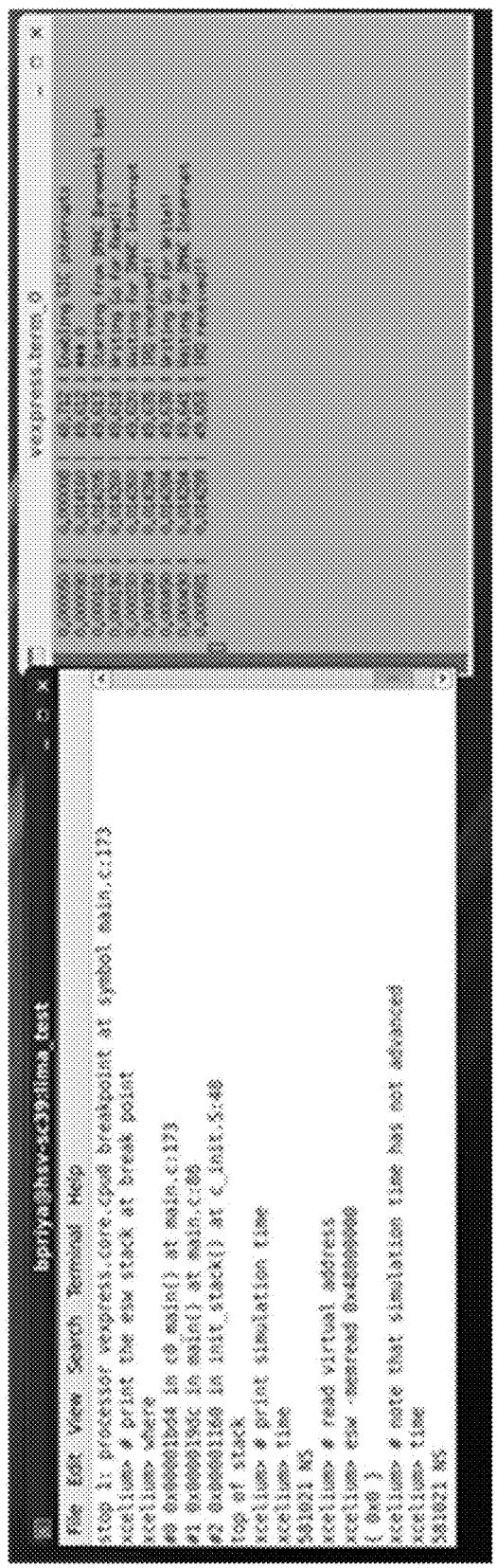
FIGS. 6-8 illustrate exemplary graphical user interfaces according to an embodiment of the present disclosure.
Figure 7:
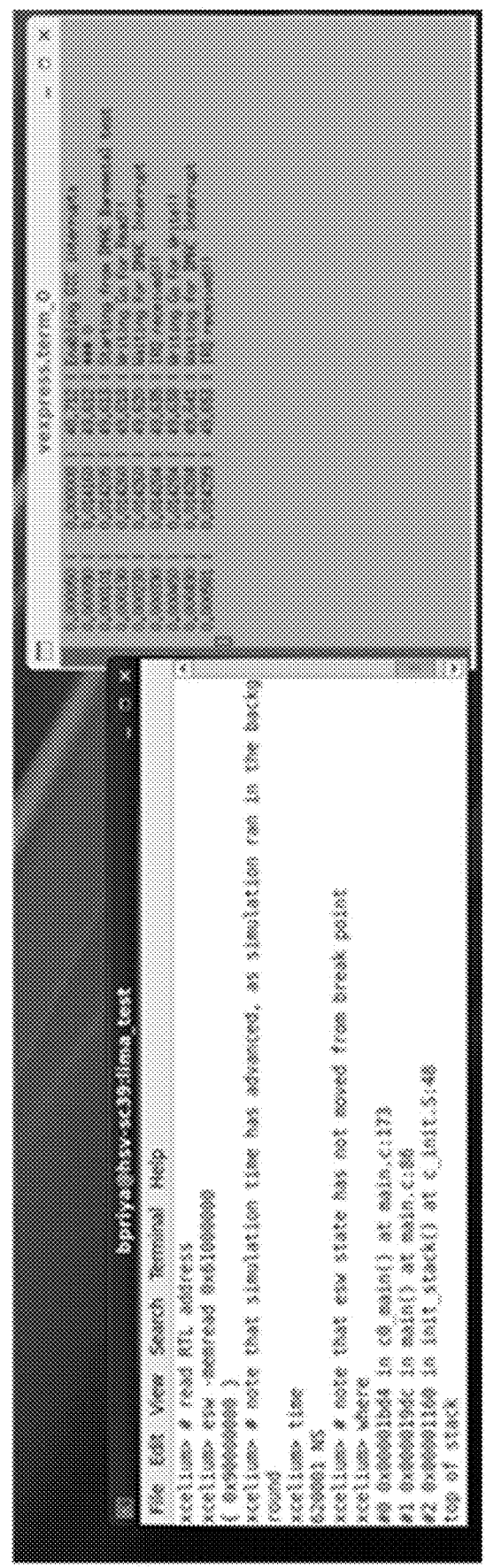
Figure 8:
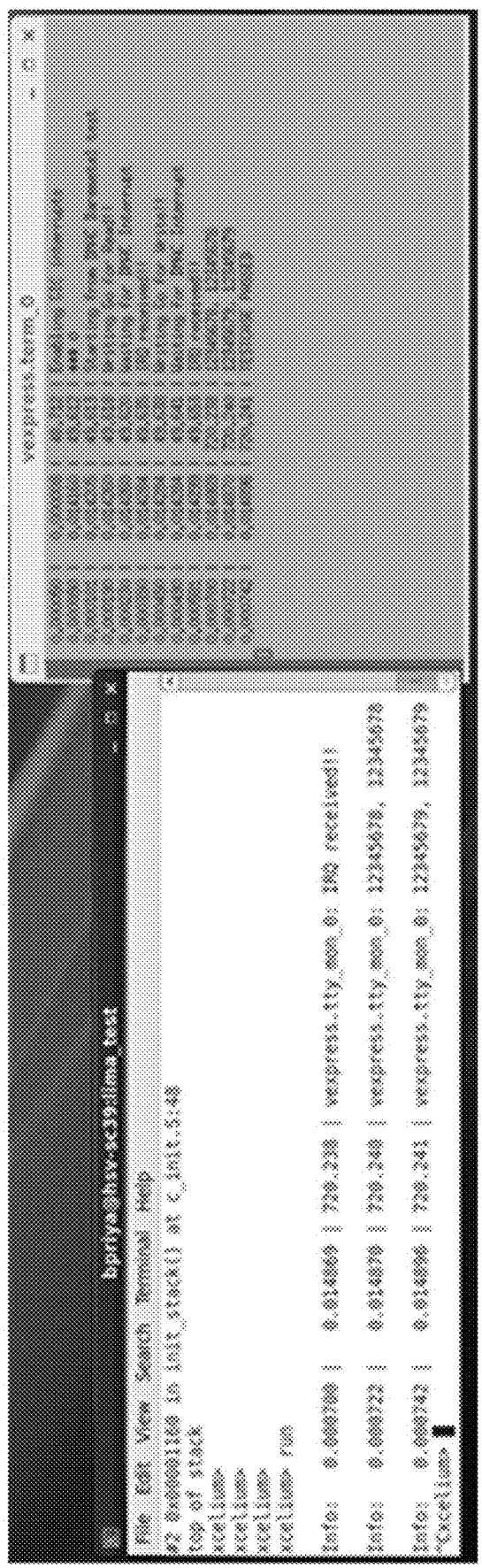

Referring now to FIGS. 6-8, examples of command line user interfaces that may be used in accordance with the present disclosure are provided. These examples depict CLIs that allow for the debugging of virtual and RTL addresses in a debugger.

Referring now to FIG. 6, a CLI 600 is provided consistent with embodiments of the present disclosure. FIG. 6 shows a hybrid platform stopped at an ESW breakpoint at the ESW debugger command prompt, and the debug of a virtual address. In this particular example, the ESW breakpoint has been placed at line 173 of file main.c. At the breakpoint, the ESW stack trace may be displayed at the debugger command prompt. Simulation time is at 581021 NS. The address 0x48000000 may be read at the debugger prompt. This address may map to a virtual model, and the value may be returned instantaneously in zero simulation time.

Referring now to FIG. 7, a CLI 700 is provided consistent with embodiments of the present disclosure. FIG. 7 shows the debug of an RTL address at the same ESW breakpoint. Here, the RTL address 0x61000000 may be read at the debugger prompt. Simulation may be triggered in the background to read the content of the RTL register/memory mapped to this address and the value may be displayed at the debugger prompt. Notice that simulation time has advanced to 620001 NS from 581021 NS. Also note, although simulation ran to access the RTL address, the ESW state has not moved from the breakpoint as demonstrated by the SW stack trace printed at the debugger prompt. Accordingly, the user debug experience for the virtual address and RTL address is consistent and seamless, but vastly different underlying mechanisms are set into motion.

Referring now to FIG. 8, a CLI 800 is provided consistent with embodiments of the present disclosure. FIG. 8 shows that after RTL register debug has occurred, simulation may revert back to a 'normal' stable state, and simulation may continue to finish the test case.

Figure 9:
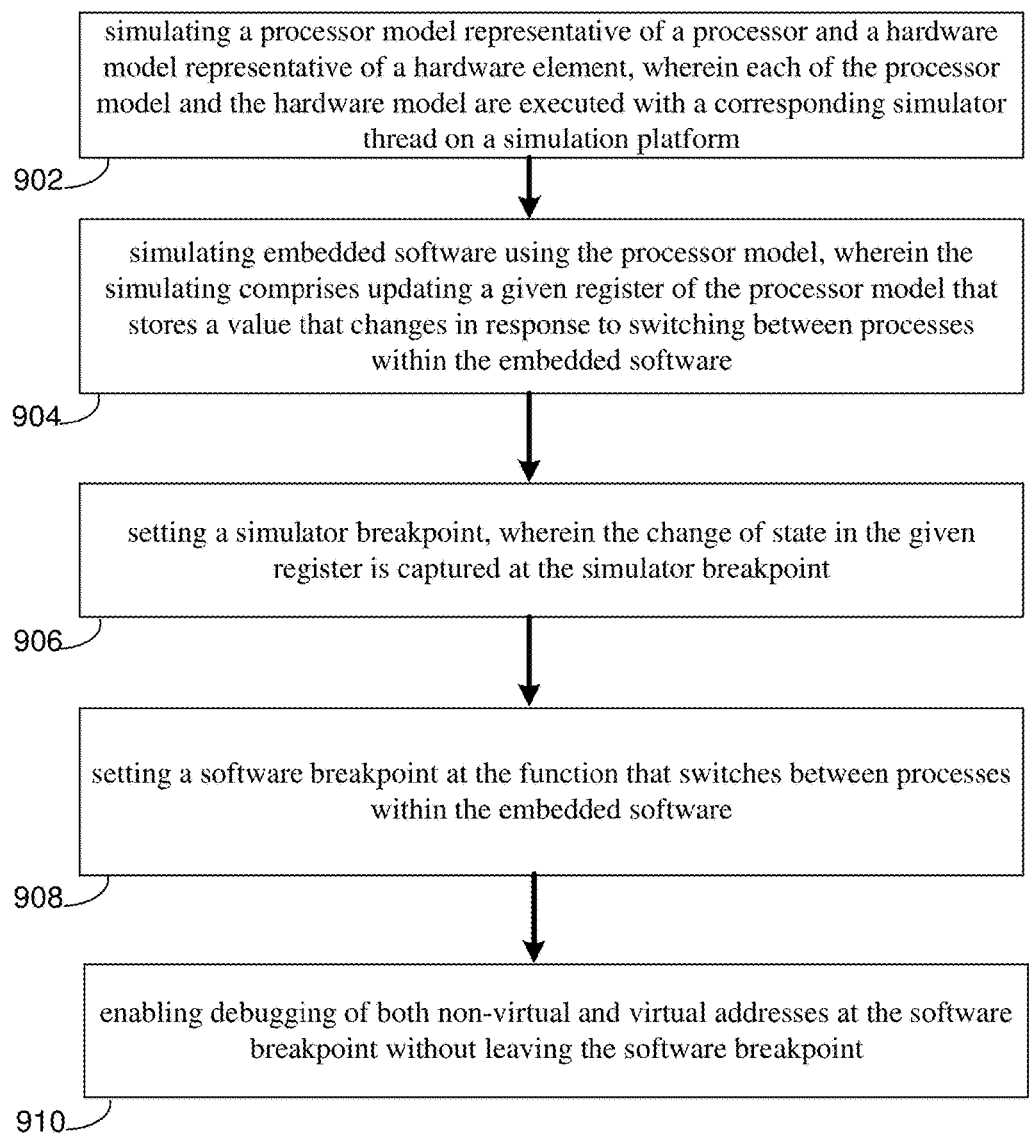
FIG. 9 illustrates a flowchart of an exemplary flowchart according to an embodiment of the present disclosure.

Referring now to FIG. 9, a flowchart 900 showing exemplary operations consistent with an embodiment of the present disclosure is provided. The method may include simulating 902 a processor model representative of a processor and a hardware model representative of a hardware element, wherein each of the processor model and the hardware model are executed with a corresponding simulator thread on a simulation platform. The method may further include simulating 904 embedded software using the processor model, wherein the simulating comprises updating a given register of the processor model that stores a value that changes in response to switching between processes within the embedded software. The method may also include setting 906 a simulator breakpoint, wherein the change of state in the given register is captured at the simulator breakpoint. The method may further include setting 908 a software breakpoint at the function that switches between processes within the embedded software. The method may also include enabling 910 debugging of both non-virtual and virtual addresses at the software breakpoint without leaving the software breakpoint. Numerous other operations are also within the scope of the present disclosure as provided herein.

Figure 10:
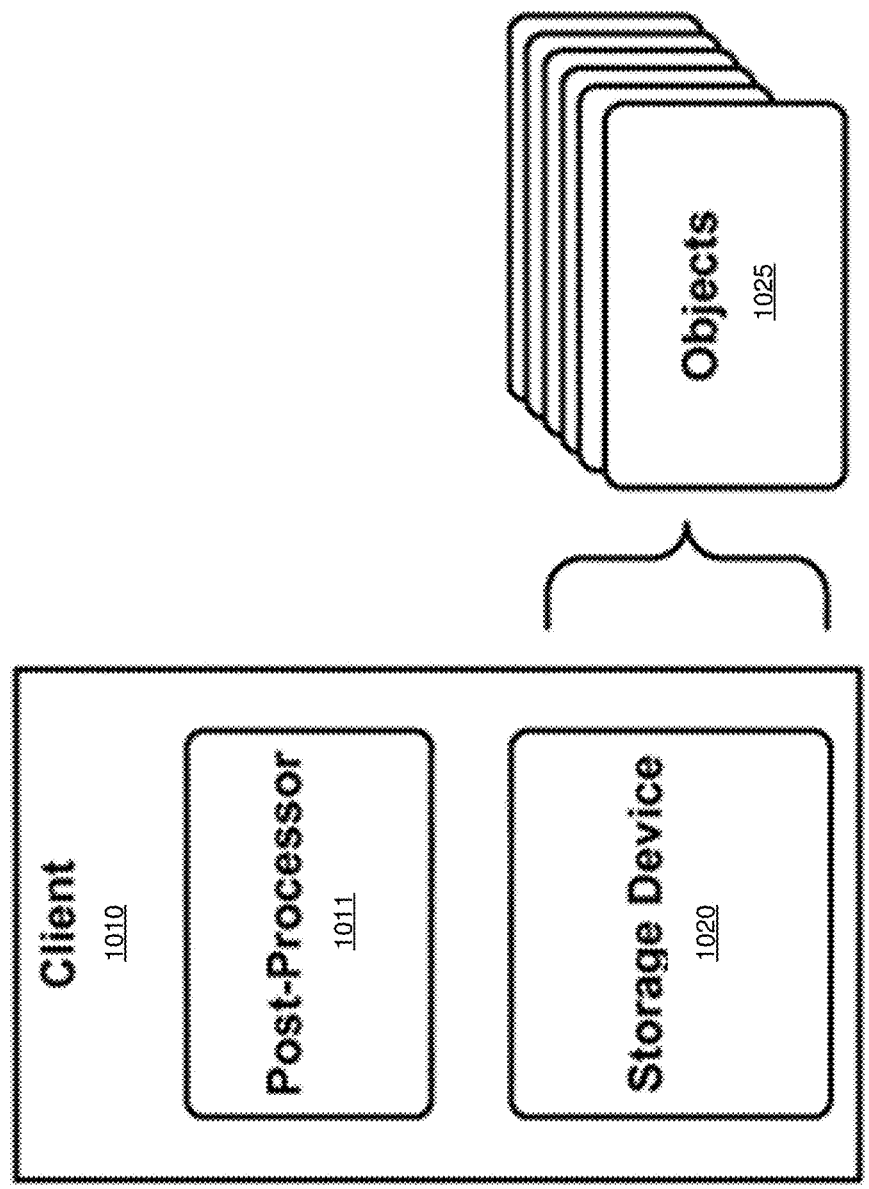
FIG. 10 is a simple block diagram illustrating components of an exemplary system according to an embodiment of the present disclosure.

In some embodiments, a user may access a simulation platform interface in a standalone client system, client-server environment, or a networked environment. FIG. 10 is a simple block diagram illustrating components of an exemplary system 1000 according to an embodiment. As shown in FIG. 4, a system 1000 may comprise a client 410 executing a simulator platform 1011 and having a memory storage 1020. The client 1010 may be any computing system that executes a simulator platform 1011 or otherwise facilitates access to memory storage 1020, for example a personal computer. The client 1010 may include a processor that performs a method in accordance with the disclosed embodiments. Such a client would be part of an overall simulation system in accordance with the disclosed embodiments.

Hardware models, instruction sets, software packages, the database, and other objects 1025 used by the simulation system may be stored in memory storage 1020. A user may access the objects 1025 stored in memory storage 1020 with the client 1010 via a simulator platform interface, where the simulator platform interface is capable of accessing memory storage 1020 and displaying the objects 1025 and the data associated with the simulation. The simulator platform interface may include a user interface, for example a program, application or middleware that acts as a frontend to and facilitates access to objects in memory storage 1020. The simulator platform interface may facilitate control over and observability into the simulation of the components implemented in a simulator platform using the tools and procedures described herein. The user may interact with the post-processing interface through a number of input devices, such as by inputting a selection as with a mouse or inputting a request as with a keyboard. The user may observe the simulation results on an output device or display. The simulator platform interface may run in an application window controlled by the user.

According to an embodiment, wherein said simulating of the modeled components facilitates the manufacture of one or more components, including component implementing embedded software.

As shown in FIG. 10, a client 1010 may be a stand-alone system, as may be of particular interest where the components simulated are highly confidential. Additionally, according to an aspect of an embodiment as shown in FIG. 11, a client 1110 may be part of a networked environment.

Figure 11:
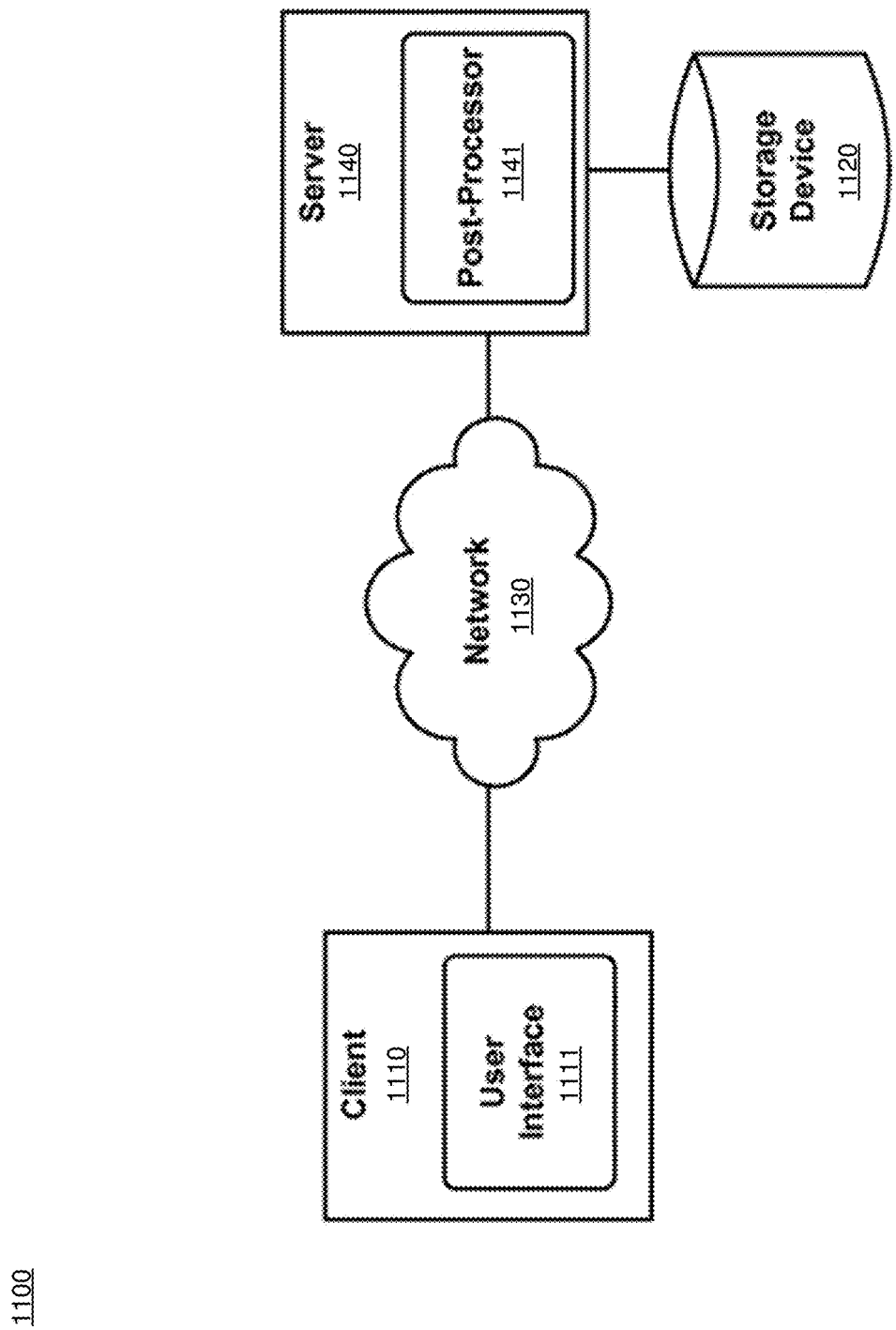
FIG. 11 is a simple block diagram illustrating components of an exemplary system according to an embodiment of the present disclosure.

FIG. 11 is a simple block diagram illustrating components of an exemplary system 1100 according to an embodiment. As shown in FIG. 11, system 1100 may include a client 1110 having a user interface 1111. The client 1110 may be connected to a server 1140 via a network 1130. The simulator platform 1141, which in this embodiment is located at server 1140, may have access to storage device 1120 storing hardware models, instruction sets, software packages, a database, and other objects utilized by the simulation system. The server 1140 may include a processor that performs a method in accordance with the disclosed embodiments. Such a server then would be part of the overall simulation system in accordance with the disclosed embodiments.

In some embodiments, a user may access a simulator platform 1141 at the server 1140 via the client 1110 having a user interface 1111 capable of accessing and displaying the components implemented as part of a simulator platform and the simulation of those components. The client 1110 may be any computing system that facilitates the user accessing storage device 1120, for example a personal computer. The network 1130 may be a wired or wireless network that may include a local area network (LAN), a wireless area network (WAN), the Internet, or any other network available for accessing storage device 1120 from the client 1110.

In some embodiments, the server 1140 may be a network server accessible to the client 1110 via the network 1130 that may manage access to storage device 1120. The user interface 1111 may receive instructions regarding analyzing a simulation from the user and utilizing the objects stored in memory storage 1120, facilitate a display of the simulation results queried from the described databases. Multiple different clients (not shown) may access storage device 1120 via the network 1130 and request access to the objects stored therein.

In another networked environment, the simulator platform may be executed on a network capable client and access the other objects stored in one or more storage devices via a network and communications server.

Figure 12:
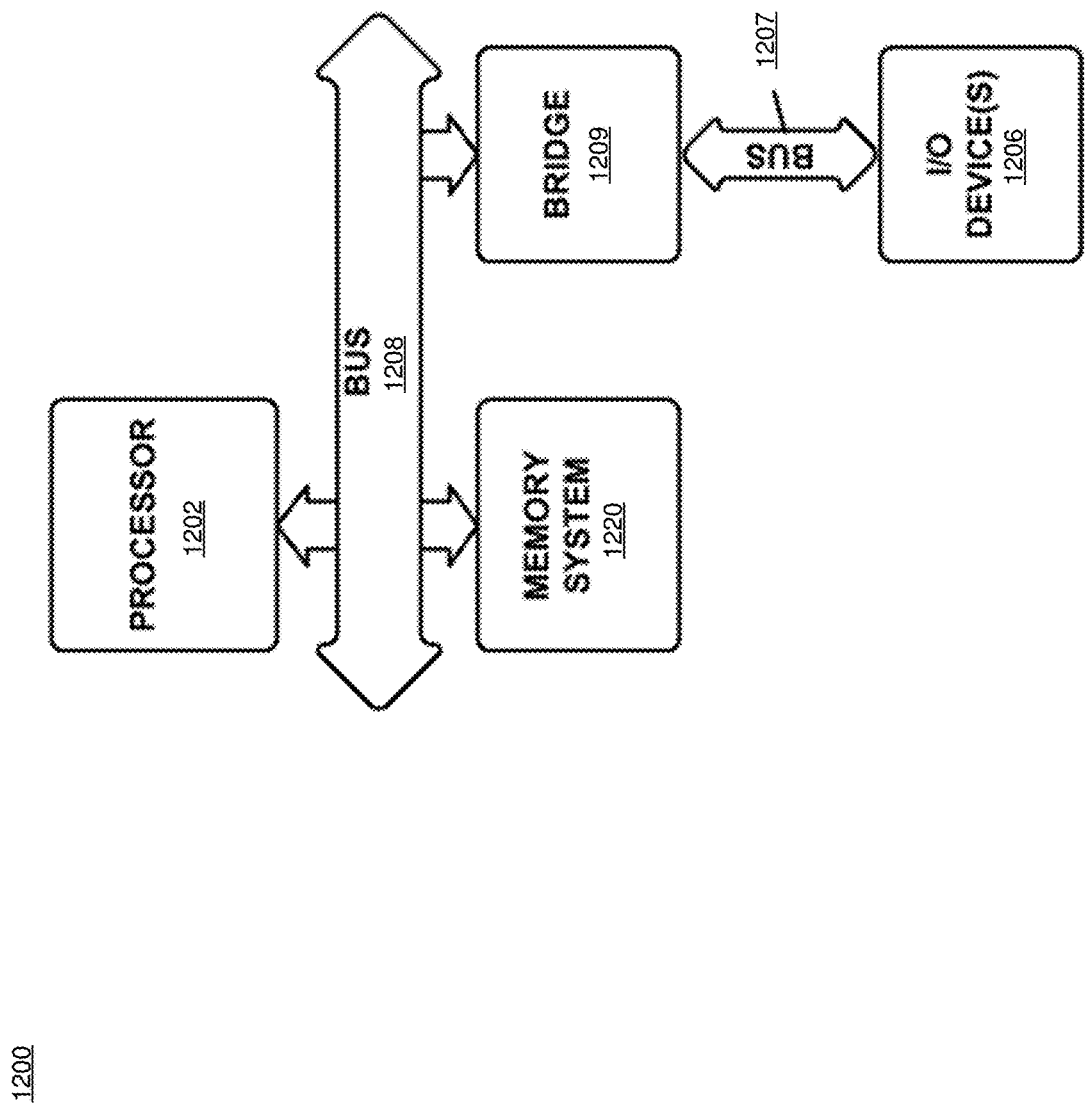
FIG. 12 is a simple block diagram illustrating components of an exemplary client according to an embodiment of the present disclosure.

FIG. 12 is a block diagram illustrating components of an exemplary client 1210 according to an embodiment of the present invention. As shown in FIG. 12, the client 1210 configured to execute the simulator platform as described herein may include a processor 1202, a memory system 1220 and one or more input/output (I/O) devices 1206 in communication. The communication can be implemented in a variety of ways and may include one or more computer buses 1207, 1208 and/or bridge devices 1209 as shown in FIG. 12. The I/O devices 1206 can include network adapters and/or mass storage devices from which the client 1210 can receive commands for executing the simulation.

Embodiments included herein provide numerous advantages over existing systems. One existing approach attempts to service the RTL debug access in zero simulation time without running the simulator by providing a backdoor access into the RTL model using hierarchical path names. However, this approach is intrusive, as it requires the ESW hybrid platform to be altered by inserting special debug adapter models that issue the custom backdoor access calls. Moreover, the debug adapter models need to be customized for each platform with specific RTL hierarchical path names for that platform. Often custom access logic needs to be written if the RTL address straddles across multiple path names, and hence does not scale well. Finally, this approach does not work at all for any RTL model that is encrypted, or does not provide access permissions.

In contrast, embodiments included herein are far superior to this existing approach as it is completely generic and non-intrusive, providing an out-of-the-box, push-button solution that scales well to any hybrid ESW platform.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIGS. 3, 5, and 9 do not necessarily imply a particular order or sequence of events, nor are they intended to exclude other possibilities. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:
   simulating a processor model representative of a processor and a hardware model representative of a hardware element, wherein each of the processor model and the hardware model are executed with a corresponding simulator thread on a simulation platform;
   simulating embedded software using the processor model, wherein the simulating the embedded software includes updating a given register of the processor model that stores a value that changes in response to switching between one or more processes within the embedded software;

setting a simulator breakpoint, wherein a change of state in the given register is captured at the simulator breakpoint;

setting a software breakpoint at a function that switches between the one or more processes within the embedded software; and enabling debugging of both non-virtual and virtual addresses at the software breakpoint without leaving the software breakpoint, wherein the non-virtual addresses are associated with a register transfer level model written in a first hardware description language and the virtual addresses are associated with a transaction level model written in a system level modeling language.

2. The computer-implemented method of claim 1, further comprising:
issuing a transaction function call associated with a debugger control thread at the software breakpoint on a virtual processor model.

3. The computer-implemented method of claim 2, further comprising:
intercepting the transaction function call; and
diverting the transaction function call to an application programming interface associated with a simulator.

4. The computer-implemented method of claim 3, further comprising:
spawning and scheduling a special virtual thread to issue a non-debug transaction to a user-specified non-virtual address with a necessary state from the transaction function call.

5. The computer-implemented method of claim 4, further comprising:
suspending a virtual processor thread that reached the software breakpoint.

6. The computer-implemented method of claim 5, further comprising:
setting an internal simulator breakpoint.

7. The computer-implemented method of claim 6, further comprising:
switching to a simulator main thread and enabling the special virtual thread to run and complete the non-debug transaction to the user-specified non-virtual address.

8. The computer-implemented method of claim 7, further comprising: triggering the internal simulator breakpoint.

9. The computer-implemented method of claim 8, further comprising:
resuming the suspended virtual processor thread.

10. The computer-implemented method of claim 9, further comprising:
switching back to the debugger control thread due to triggering of the internal breakpoint;
obtaining results of the transaction function call from the special virtual thread; and
returning the results for debugging.

11. A system comprising:
a memory storing machine-readable instructions comprising a plurality of component models including a processor model representative of a processor and a hardware model representative of a hardware element, and embedded software for execution using the processor model during a simulation of the plurality of component models; and
a processor configured to access the memory and execute the machine-readable instructions, the machine-readable instructions causing the processor to:
simulate the processor model representative of the processor and the hardware model representative of the hardware element, wherein each of the processor model and the hardware model are executed by the processor with a corresponding simulator thread;
simulate the embedded software using the processor model;
set a software breakpoint at a function that switches between processes within the embedded software; and
enable debugging of both non-virtual and virtual addresses at the software breakpoint without leaving the software breakpoint, wherein the non-virtual addresses are associated with a register transfer level model written in a first hardware description language and the virtual addresses are associated with a transaction level model written in a system level modeling language.

12. The system of claim 11, wherein the machine-readable instructions cause the processor to:
issue a transaction function call associated with a debugger control thread at the software breakpoint on a virtual processor model.

13. The system of claim 12, wherein the machine-readable instructions cause the processor to:
intercept the transaction function call; and
divert the transaction function call to an application programming interface associated with a simulator.

14. The system of claim 13, wherein the machine-readable instructions cause the processor to:
spawn and schedule a special virtual thread to issue a non-debug transaction to a user-specified non-virtual address with a necessary state from the transaction function call.

15. The system of claim 14, wherein the machine-readable instructions cause the processor to:
suspend a virtual processor thread that reached the software breakpoint.

16. The system of claim 15, wherein the machine-readable instructions cause the processor to:
set an internal simulator breakpoint.

17. The system of claim 16, wherein the machine-readable instructions cause the processor to:
switch to a simulator main thread and enable the special virtual thread to run and complete the non-debug transaction to the user-specified non-virtual address.

18. The system of claim 17, wherein the machine-readable instructions cause the processor to:
trigger the internal breakpoint.

19. The system of claim 18, wherein the machine-readable instructions cause the processor to:
resume the suspended virtual processor thread.

20. The system of claim 19, wherein the machine-readable instructions cause the processor to:
switch back to the debugger control thread due to triggering of the internal breakpoint;
obtain results of the transaction function call from the special virtual thread; and
return the results for debugging.

* * * * *